(12) United States Patent
Millette et al.

(10) Patent No.: US 7,188,051 B2
(45) Date of Patent: Mar. 6, 2007

(54) APPARATUS AND METHODS FOR MAINTENANCE TASK ANALYSIS

(75) Inventors: Michael A. Millette, Snohomish, WA (US); David W. Twigg, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/196,165

(22) Filed: Aug. 3, 2005

(65) Prior Publication Data

US 2007/0032988 A1 Feb. 8, 2007

(51) Int. Cl.
*G06F 3/023* (2006.01)

(52) U.S. Cl. ............... 702/184; 702/177; 702/186; 702/188

(58) Field of Classification Search ........... 702/176, 702/182–188, 177; 707/102; 709/226; 705/10, 705/27
See application file for complete search history.

(56) References Cited

U.S. PATENT DOCUMENTS 6,839,680 B1 * 1/2005 Liu et al. ............... 705/10
7,051,036 B2 * 5/2006 Rosnow et al. ......... 707/102
2005/0187721 A1 * 8/2005 Baust et al. ............. 702/34

OTHER PUBLICATIONS

AeroInfo Systems Inc.—A Boeing Company, Mainstream Component Set, Oct. 5, 2005.
Enterprise One—Maintenance and Engineering Services, Improved Planning and Production Control, Oct. 5, 2005.
SM Global Inc., FastMaint—Frequently asked questions (FAQ), Oct. 5, 2005.

* cited by examiner

*Primary Examiner*—Marc S. Hoff
*Assistant Examiner*—Felix Suarez
(74) *Attorney, Agent, or Firm*—Harness, Dickey & Pierce, P.L.C.

(57) ABSTRACT

A system for evaluating time requirements for performing maintenance on a maintenance object. One or more processors and memory are operable to provide a form on which a user describes a maintenance task. The described task is made available for maintenance time analysis as at least one of the following: a main task, a subtask of another main task, and an elementary operation. The user is allowed to combine a plurality of described tasks into one or more hierarchies designated by the user. This system provides flexibility to evaluate maintenance task times regardless of whether a level of detail and/or design maturity is minimal or complete.

12 Claims, 7 Drawing Sheets

SUPERTASK SUMMARY - FORM 2

TASK CODES

PRIMARY ☐  STEP ID  WBS ☐ EAR CREW 2  TIME IN MINUTES  ELAPSED 5.607000  LABOR 11.214000

ASN 32-24-11D-Q01  ANALYTIC BUILDUP

ACTION CODE 11 REMOVE/REPLACE-UNSCHEDULED

STEP ID AA  MODEL 737  SERIES 300 300B  REV 0

TASK DESCRIPTION  INSTL STABILIZATION JACK NOTE: 2 MECHS REMAIN AFTER THIS

SUB-OP

REPORT  CLEAR  SAVE  RECALCULATE  SEND TO FORM # 1

P-EDIT

| DESCRIPTION | O | FACTOR | PCT | REPS | PERS |
|---|---|---|---|---|---|
| FINAL POSIT JACK | N | 1.000 | 100% | 1.00 | BB |
| ADJUST CYLINDER INNER SCREW | N | 1.000 | 100% | 1.00 | B |
| UNLOCK LOCK SCREW ON CYLINDER LOCK NUTS | N | 1.000 | 100% | 1.00 | B |
| SIGNAL BETWEEN MECHS (EQ TO) | N | 1.000 | 100% | 1.00 | BB |
| TURN ON CONSOLE PWR SWITCH | N | 1.000 | 100% | 1.00 | B |
| ALLOW PRESS TO BUILD UP | N | 1.000 | 100% | 150.00 | B |
| OPEN VALVES TO STABILIZATION JACKS | N | 1.000 | 100% | 30.00 | B |
| CLOSE BLEED ON JACK | Y | 1.000 | 100% | 1.00 | B |
| OPEN CONSOLE FLOW CONTROL VALVE SLOWLY | N | 1.000 | 100% | 1.00 | B |
| OBSERVE PRESS GAGE ON STAB JACKS (PRELOAD ST | N | 1.000 | 100% | 3.00 | B |
| SIGNAL CONSOLE OPERATOR WHEN APPROX PRESS I | N | 1.000 | 100% | 3.00 | B |

APPARATUS AND METHODS FOR MAINTENANCE TASK ANALYSIS

FIELD OF THE INVENTION

The present invention relates generally to design and maintenance of objects such as vehicles and equipment and more particularly (but not exclusively) to analyzing time requirements for maintaining a maintenance object such as an aircraft.

BACKGROUND OF THE INVENTION

For an airline, one major cost of operation is the time and labor required to keep an aircraft fleet in service. Thus it is important for aircraft to have a design that is maintainable. As an aircraft design is being developed and/or modified, it would be desirable to evaluate the effects of aircraft design changes on maintenance time and labor. Currently available tools, however, lack sufficient flexibility and agility needed to track such parameters from preliminary design to firm configuration.

SUMMARY OF THE INVENTION

The present invention, in one aspect, is directed to a system for evaluating time requirements for performing maintenance on a maintenance object. One or more processors and memory are operable to provide a form on which a user describes a maintenance task. The described task is made available for maintenance time analysis as at least one of the following: a main task, a subtask of another main task, and an elementary operation. The user is allowed to combine a plurality of described tasks into one or more hierarchies designated by the user.

In another aspect of the invention, the invention is directed to a system for evaluating time requirements for performing maintenance on a maintenance object. One or more processors and memory are operable to describe a first maintenance task as a first hierarchy of subtasks, describe a second maintenance task as a second hierarchy of subtasks, relate the second task to the first task as a subtask of the first task, and use times associated with a plurality of elementary operations included in the subtasks to analyze at least one of the first and second tasks.

In yet another aspect, a method of evaluating time requirements for performing maintenance on a maintenance object includes providing a form on which a user describes a maintenance task. The described task is made available for maintenance time analysis as at least one of the following: a main task, a subtask of another main task, and an elementary operation. The method includes allowing the user to combine a plurality of described tasks into one or more hierarchies designated by the user.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses. Although various configurations of the present invention are described in connection with aircraft design and maintenance, the invention is not so limited. It should be noted that the invention can be practiced in connection with various types of equipment and various types of vehicles, including but not limited to ships, motor vehicles, trains, and space vehicles.

In some configurations, the invention is directed to a system and method for evaluating time requirements for performing maintenance on a maintenance object e.g. an aircraft. A form is provided on which a user describes a maintenance task. The described task is made available for maintenance time analysis as at least one of the following: a main task, a subtask of another main task, and an elementary operation. The user is allowed to combine a plurality of described tasks into one or more hierarchies designated by the user.

Generally, a maintenance task may be characterized by a collection of subtasks needed to perform the task. Some subtasks could be performed independently and/or could overlap and/or be performed simultaneously. Additionally or alternatively, some subtasks could be dependent on one another and/or could need to be performed in a particular sequence. In analyzing a maintenance task in accordance with some implementations of the invention, a user e.g. an analyst, may consider subtasks, relationships among subtasks, environmental impacts, and labor availability to determine labor and elapsed time requirements for performing the task. A distinction between tasks and subtasks may be arbitrary. A subtask may also be a task. For example, removal of an aircraft panel can be analyzed as a task; this task could be a subtask of remove/replace tasks for equipment accessed through the panel.

In some configurations of the invention, task data detail may be developed in arbitrary order. An analyst may start with a main task and decompose the task into subtasks, repeating the decomposition until the subtask elapsed and labor times can be determined, for example, from a table of elementary operations or from a library of completed task analyses. Additionally or alternatively, an analyst may work in the opposite direction, composing tasks from elementary operations, and successively combining such tasks into more complex tasks until a desired task is analyzed. Additionally or alternatively, an analyst may start in the middle of a task analysis process and work in both directions toward completing the analysis.

Detailed, lower-level analysis elements, which could include complete analyses, can be nested under a larger parent analysis which may be a Supertask (also referred to as a Primary Task). By the same token, a higher-level Supertask can be developed initially and, as more information becomes available, lower level subtasks can be detailed as needed.

Figure 1:
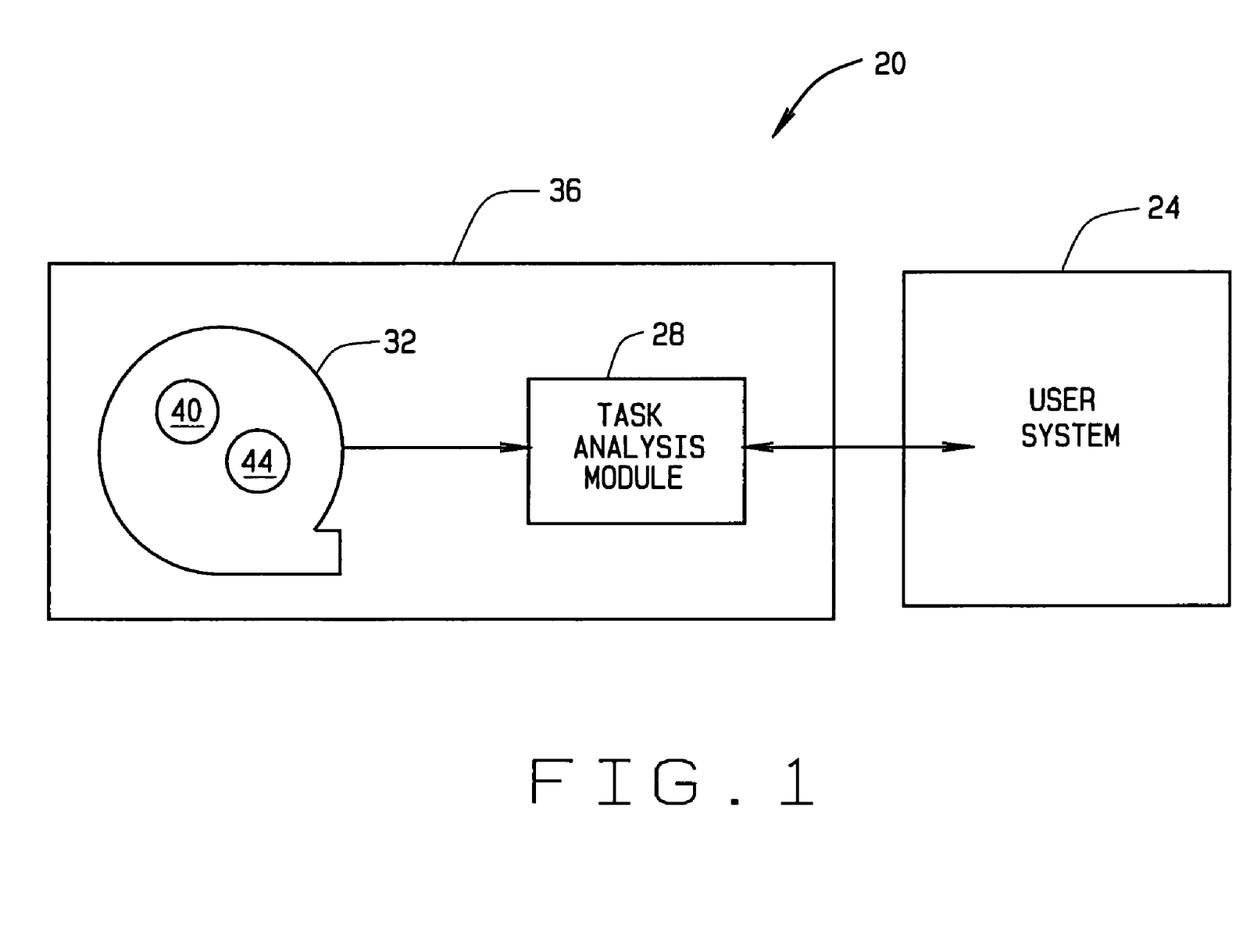
FIG. 1 is a block diagram of a system for evaluating maintenance time requirements of a vehicle in accordance with one implementation of the invention.

A block diagram of a system for evaluating maintenance time requirements of a vehicle is indicated generally in FIG. 1 by reference number 20. The system 20 includes one or more user systems 24 in communication with a task analysis module 28. The module 28 may receive input from one or more databases 32. Some configurations of the module 28 may be implemented as a Microsoft® Windows-based application. One user system 24 is shown in FIG. 1 and may be, for example, a user computer having a monitor. The database (s) 32 and analysis module 28 reside in a computer 36 including a processor and memory. It can be appreciated, however, by those skilled in the art that many different arrangements are possible with respect to how computers and software may be configured to implement various embodiments of the invention. Configurations, for example, are possible in which the entire system 20 resides in a single computer. In some other configurations, the database(s) 32 may reside, for example, remotely from the analysis module 28.

The user system(s) 24 may include, for example, Microsoft Access database(s) for constructing task time analyses. The database(s) 32 may include, for example, one or more SQL server databases accessed using Structured Query Language (SQL). In other configurations, other databases and/or languages may be used. In the present example, databases 32 include a database 40 of primitive tasks, also called elementary maintenance operations. Also included in the database 40 are times for performing the elementary operations. A database 44 includes a plurality of archived task analyses.

In the system 20, task time analysis may be modeled as a tree structure. Complex tasks can be subdivided into subtasks, which can again be subdivided if appropriate. For example, a task "Remove and Replace Flat Tire" can be broken into subtasks: "Replace Tire", "Block Wheels", "Jack up Vehicle", "Remove Tire", and "Install New Tire". The subtask "Remove Tire" can be further broken down into a subtask list: "Remove Hub Cap", "Remove Axle Nut", and "Dismount Tire". The subtask "Install New Tire" can be further broken down into a subtask list: "Mount New Tire", "Replace Axle Nut", and "Replace Hub Cap". Note that the foregoing hierarchical approach is a convenience. In the "Replace Tire" analysis, the subtasks "Remove Tire" and "Install New Tire" could be replaced by their subtask lists to collapse the analysis to a single level of subtasks. However these subtasks could appear in other analyses (e.g. a "Rotate Tires" analysis), and it may be convenient to have these tasks available to a user system 24.

Figure 2:
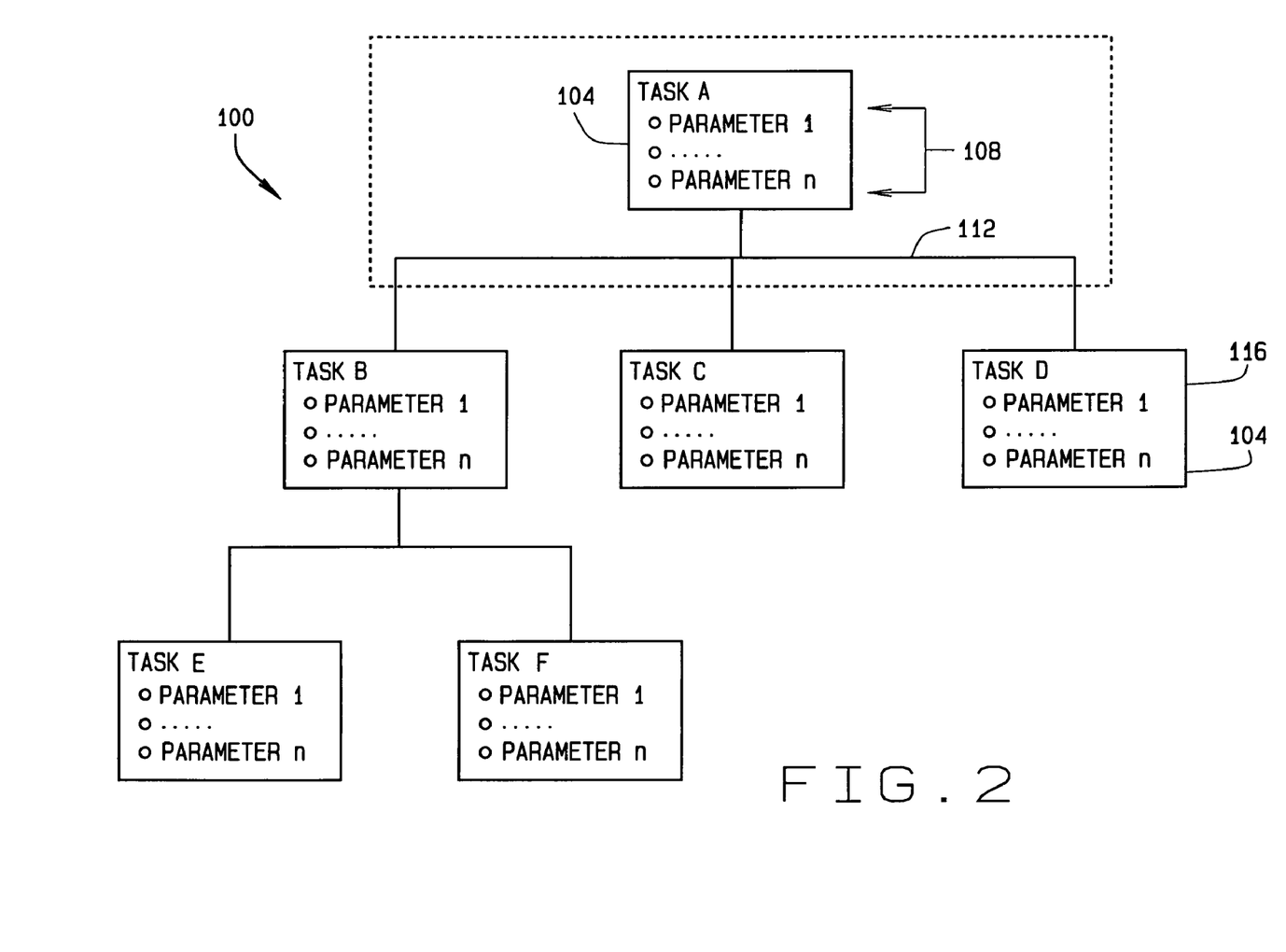
FIG. 2 is a block diagram of a task tree structure in accordance with one implementation of the invention.

An exemplary task tree structure utilized in the system 20 is indicated generally in FIG. 2 by reference number 100. Each task 104 includes basic task information, indicated as a plurality of parameters 108, and also may include one or more links 112. Parameters 108 may include description, crew size, labor hours, elapsed hours, part ID code, and Work Breakdown Structure number (WBS) as further described below. Link(s) 112 point to subtask(s) 116 nested in a task 104 and may include additional information, e.g. percent of time that the subtask is necessary, and a number of repetitions of the subtask.

In some configurations, all tasks 104 include essentially the same structure. To perform an analysis, subtasks are created and linked and link information is provided. If a task 104 has links 112 to subtasks, labor time and elapsed time are calculated from subtask times and link information; otherwise these values are given as part of the basic task information.

In operation, the system 20 may provide forms in windows to a user for interactive use, one exemplary implementation of which shall now be described. It should be noted, however, that the following screenshots are exemplary only, and other configurations are contemplated in which different system-user interfaces could be used.

Figure 3:
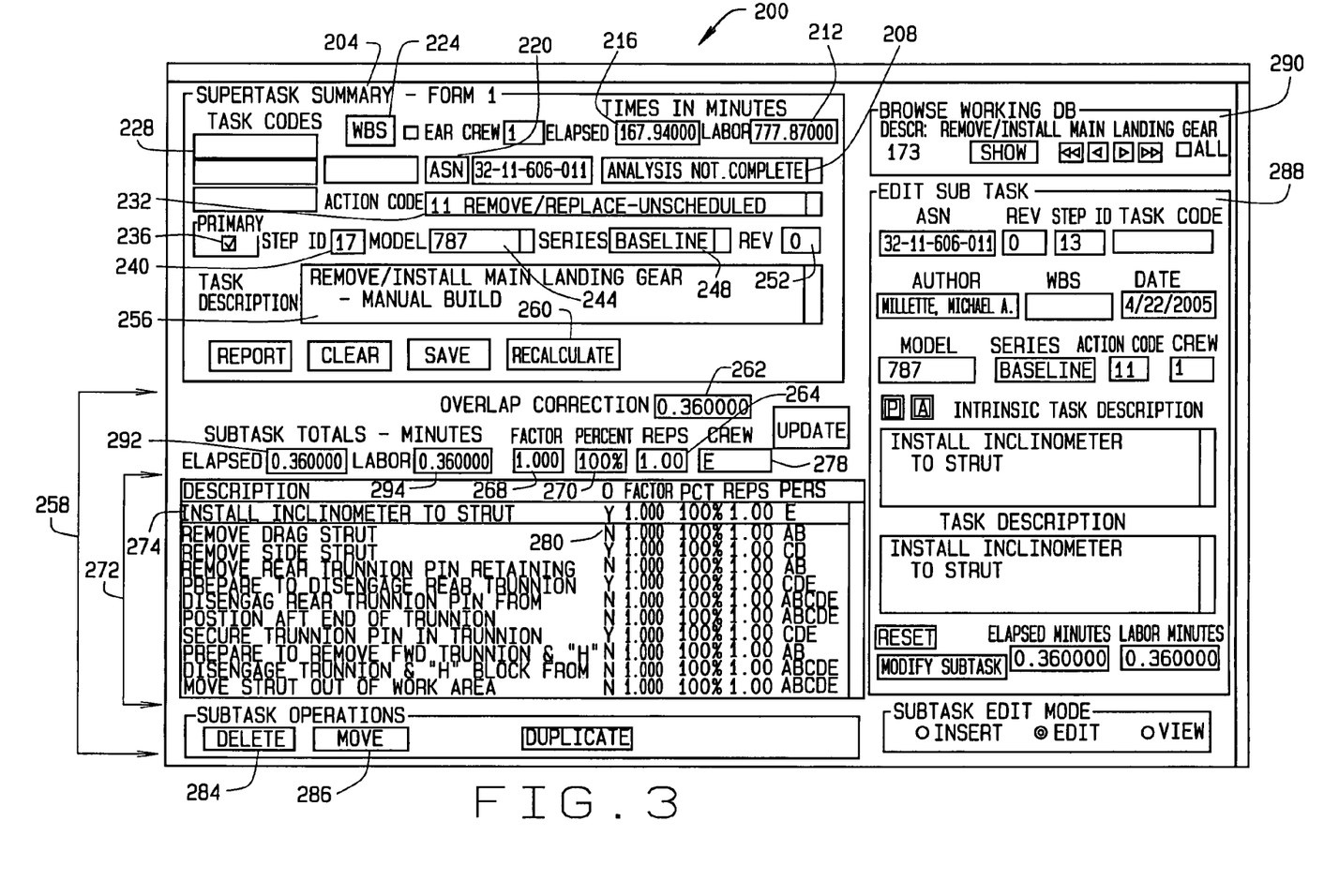
FIG. 3 is an illustration of a supertask edit form for a task in accordance with one implementation of the invention.

A screen shot of a Supertask Edit form is indicated generally in FIG. 3 by reference number 200. The edit form 200 may be used to create, view and/or edit maintenance task time analyses. The form 200 has a Form designation 204, which is "1". Additional and/or supplemental Supertask Edit forms can be created and/or invoked as further described below to edit subtasks before nesting them under a Primary Task on a form 200 designated "Form 1". An analysis status drop-down menu 208 includes options for describing task analysis status. Such options may include "Analysis not complete", "Estimate", "Analytical Buildup", "Validated by Physical Demo", etc.

A Labor Minutes field 212 describes labor time of all individuals working the task described by the form 200. The field 212 may display time in minutes, hours or task units. This is where a user would insert a labor time for a new task that has no task primitive. An Elapsed Minutes field 216 describes elapsed time of the task described by the form 200. The field 216 may display time in minutes, hours or task units. This is where a user would insert an elapsed time for a new task that has no task primitive. A Part ID code (ASN) 220 identifies a specific aircraft part. It may be desired to use an alternate numbering scheme. By clicking on a background menu further described below, a different coding system may be selected, e.g., from Work Unit Code (WUC) or Other. A WBS (Work Breakdown Structure) number field 224 allows a user to identify a WBS for the aircraft equipment subject to the analysis. Task Code boxes 228 may be used to identify various types of scheduled maintenance tasks.

An Action Code 232 identifies a primary type of activity that is taking place in the described maintenance task, for a specific Part ID code 220. Examples include "Remove/Replace-Unscheduled", "Inspect", "Lubricate", "Composites", etc. The Action code 232, in combination with the Part ID code 220, defines a unique record or task. A "Primary" designator 236 designates the task as a Primary Task. A step 1D 240 displays a step 1D for the displayed task. Archived tasks imported from the database 44 are displayed as Step 1.

A Model menu 244 and a Series menu 248 allow a user to select an airplane model and series. A Revision field 252 indicates the latest revision of the analysis. A Task Description field 256 allows a user to describe, for example, the overall intent of the task. A Recalculate button 260 recalculates task labor and elapsed times when activated by the user. An overlap correction field 262 indicates an elapsed time correction for a task time that overlaps time for another task.

An area 258 is used to describe subtasks of the displayed task 240. Subtask times are indicated in an Elapsed time field 292 and a Labor time field 294. A Repetitions field 264 indicates a number of repetitions of a subtask 274 selected from a list 272 of subtasks. For example, a task "Remove fastener" might display twenty-four repetitions to indicate the removal of twenty-four similar fasteners on an access panel. A Factor field 268 indicates, for example, delay in a task due to fatigue, personal time and/or other delay causes. Factors account for events that typically occur but are not generally considered part of an "ideal" maintenance task. The field 268 might account, for example, for a percentage of fastener removals resulting in a delay due to a stripped fastener. A Percent field 270 allows a user to account for task steps that may or may not occur. The user indicates a percent likelihood that this step 240 will occur. A Crew field 278 indicates a task step crew size.

An Update button 276 may be activated to update an order of subtasks of the task. The list 272 displays subtask descriptions, percent, repetitions and crew size. An occurrencing indicator 280 may indicate an impact from elements of a task that do not happen every time. For example, in an airplane that has been in service for a while, about 10% of the screws in exterior access panels will be difficult to remove. For example, a typical worst case scenario might be where 20% of the screws are frozen. A task addressing such a problem is described in Table 1.

TABLE 1

Occurrencing Example.

| Description | O | Factor | Pct | Reps | Crew |
|---|---|---|---|---|---|
| Task Preparation | N | 1.00 | 100% | 1 | 1 |
| Get tools | N | 1.00 | 100% | 1 | 2 |
| Remove screws (easy) | N | 1.10 | 80% | 50 | 2 |
| Drill out frozen screws | N | 1.10 | 20% | 50 | 1 |
| Open access panel | N | 1.00 | 100% | 1 | 1 |

A crew of two is removing 50 screws from a panel in which 20% of the screws are frozen. We assume that both crew members together remove the easy screws. Then one of the mechanics drills out the frozen screws while the other performs an unspecified, albeit useful, task. The elapsed time for removing the screws will be calculated as:

$$\frac{1.10 \times 0.80 \times 50 \times T_{SCREW}}{2} + 1.10 \times 0.20 \times 50 \times T_{FROZEN}$$

Where $T_{SCREW}$ represents the time to remove a single screw, and $T_{FROZEN}$ represents the time to drill out a single screw.

Referring again to FIG. 3, a Delete Task button 284 may be activated to delete a selected subtask 274. A Move Task button 286 may be activated to move a selected subtask to a new location in the list 272. An Edit Subtask area 288 may be activated to edit a step 204 if it has subtasks nested in it. A Browse Working Database field 290 allows a user to scroll through a list of tasks that are available for editing.

Figure 4:
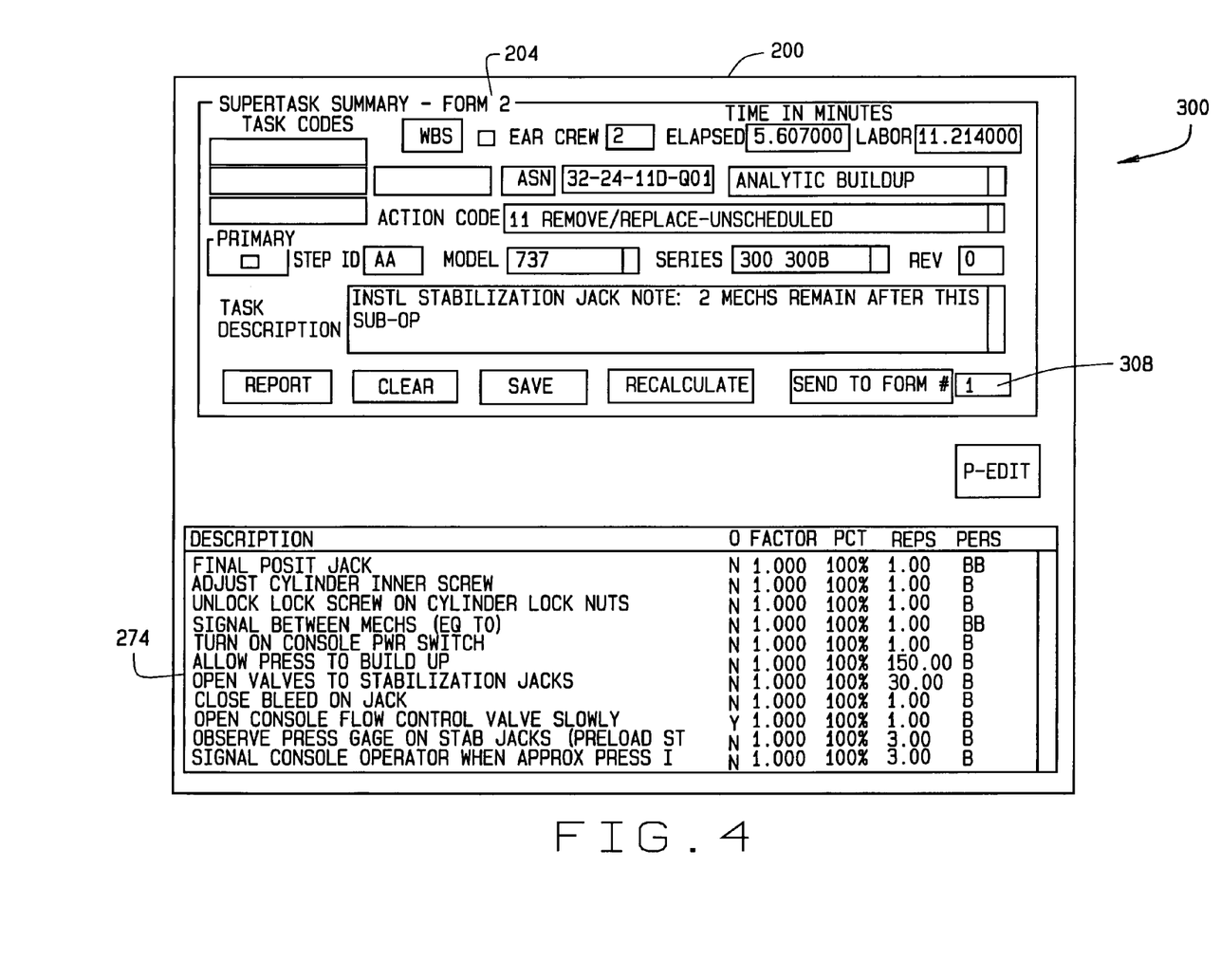
FIG. 4 is a is an illustration of a supertask edit form for a subtask in accordance with one implementation of the invention.

FIG. 4 illustrates a portion 300 of a Supertask Edit form 200 in which a subtask is described. To distinguish between activating a form 200 to describe a task and activating a form 200 to describe a subtask, the form shown in FIG. 4 shall be referred to as a subtask edit form 200. The form 300 has a Form designation 204, in this case, "Form 2". Because a task displayed in the form 300 is being analyzed as a subtask, no subtask description fields 258 (shown in FIG. 3) are displayed. (If a subtask 274 were selected by the user, the subtask fields 258 would become activated for the selected subtask.) A Send To Form field 308 may be activated to send data associated with the form 300 to another form 200 selected by the user. For example, where a subtask is developed in a Supertask Form #2, selecting a "Send to Form #1" would nest the developed subtask under a Supertask Summary Form #1.

Figure 5:
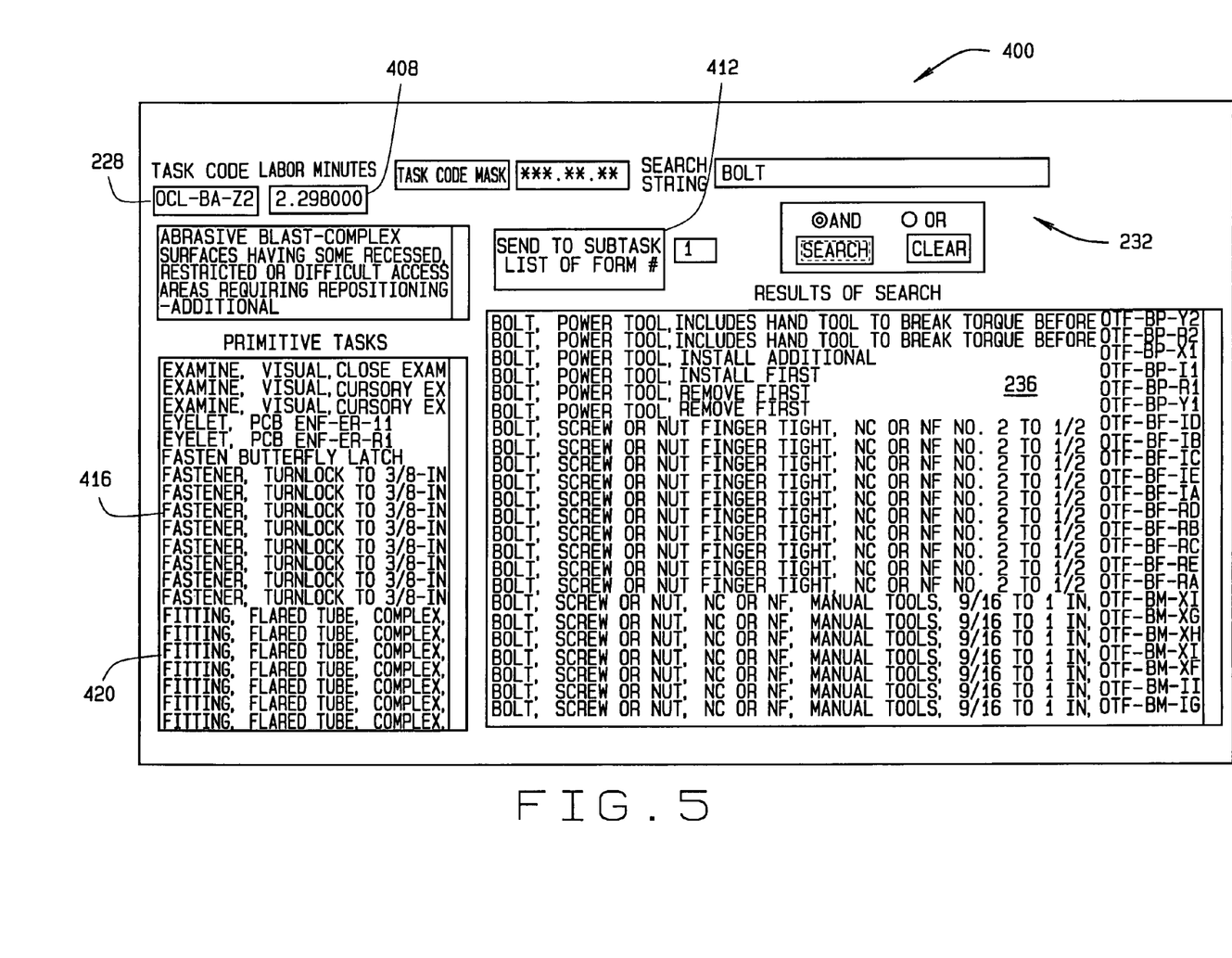
FIG. 5 is an illustration of a primitive task lookup form in accordance with one implementation of the invention.

A Primitive Task Lookup form is indicated generally in FIG. 5 by reference number 400. The form 400 may be used to invoke task primitives (also referred to as elementary operations), which are the most basic elements of a task. Generally, a task primitive may be defined to comprise a single maintenance task movement whose time has been verified relative to various maintenance tasks. Additionally or alternatively, a distribution of task times may be generated based on environment, personnel fatigue, and other relevant factors. Generally, many tasks can be grouped into task "families" where a single task has a range of time values where the task difficulty ranges from very easy to very hard. Task primitives may be stored in the database 40 (shown in FIG. 1).

Referring again to FIG. 5, a Task Code 228 displays a primitive task code which provides a reference to a more detailed description of what that task primitive includes. A Task Labor Minutes field 408 displays Task Primitive labor time in minutes. A Send To Subtask button 412 may be activated to send a selected task primitive to a subtask list 272 of a form 200.

A search of primitives may be performed by using a scrollable alphabetically ordered list 416 of task primitives 420, by using the Task Code 228, and/or by using a Search Task Descriptions feature 232. A window 236 displays all tasks from the "Primitive Tasks" list 416 which meet the search criteria.

Figure 6:
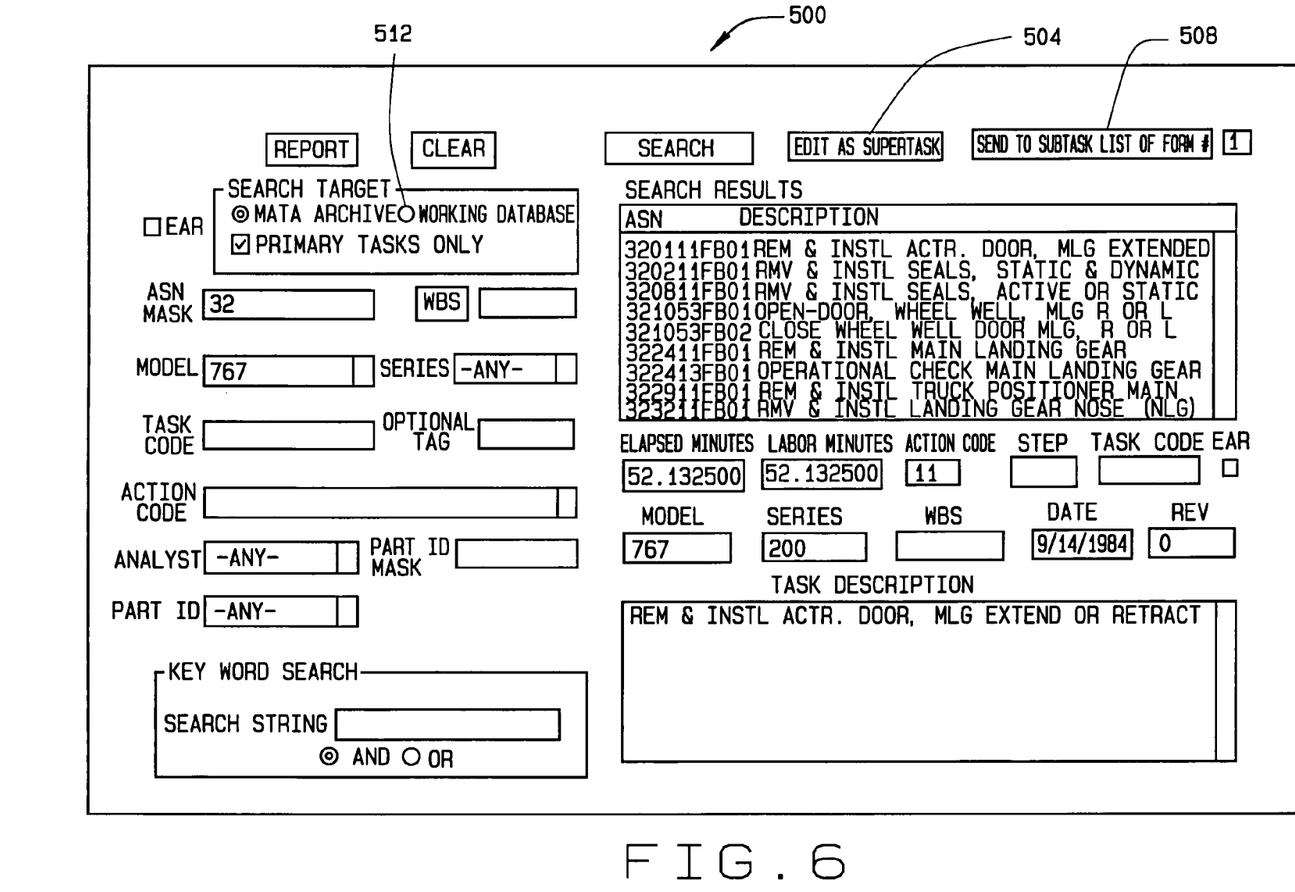
FIG. 6 is an illustration of an archives lookup form in accordance with one implementation of the invention.

An Archive Lookup form is indicated generally in FIG. 6 by reference number 500. The form 500 is used to invoke previous task analyses that have been saved in the archives database 44. Such analyses may include, for example, detailed task build-ups from a variety of aircraft models. A user may use the form 500 to perform a search for an analysis, activate a button 504 to edit the analysis as a Supertask, and/or activate a button 508 to send the selected analysis to a subtask list 272 of a particular form 200.

As new analyses are developed, they may be saved to a user's working database (not shown). A user may activate a button 512 on the form 500 to perform a search of a user database for a previously saved analysis. The user may then, for example, edit the analysis, send it to a subtask list, or delete it. Once such analyses reach a desired maturity, they may be reviewed and added to the archive database 44.

Figure 7:
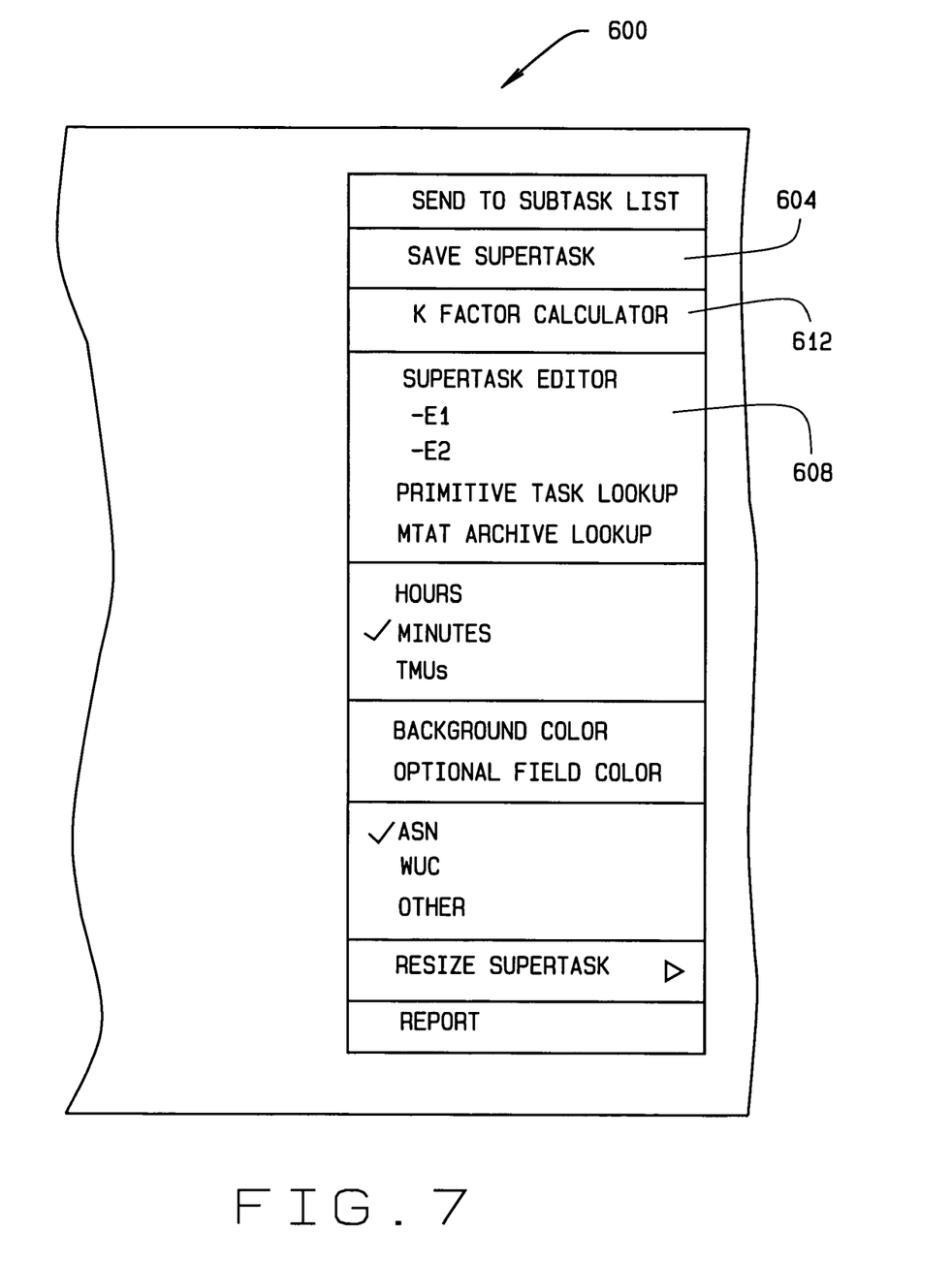
FIG. 7 is an illustration of a menu in accordance with one implementation of the invention.

An exemplary background menu is indicated generally in FIG. 7 by reference number 600. A user may invoke the menu 600 and activate an area 604 to save a current task. The user may selectively activate an area 608 to edit a current subtask, perform a primitive task lookup, or perform an archive lookup as previously described.

The user may activate an area 612 of the menu 600 to calculate one or more factors influencing labor time for a task. Such factors include personal time, fatigue and delay.

For some maintenance tasks that are analyzed, the work to be performed may be well defined and the method of analysis provided by the system 20 typically results in accurate task analysis. In other instances, particularly early in a design cycle, product definition of equipment and/or installations under analysis may be limited and a task to be analyzed may not be well defined. The system 20 allows analyses to be developed from preliminary design concepts to post production levels of detail.

Some implementations of the foregoing system and methods may be used by an analyst to obtain a range of maintenance analyses based on a level of design maturity and/or a level of detail available to the analyst. Analyses can range, for example, from a high-level estimate, e.g., for evaluating early design studies, to detailed, highly accurate maintenance predictions, where the maturity of the design supports that level of detail.

There is no limit on the depth of hierarchy of subtasks, and for a task on any level, the subtask hierarchies can have different depths—for example, one subtask of a task may be further decomposed into (sub) subtasks and another may not.

This flexibility is useful in preliminary design—initially the configuration is not fixed, and the steps to remove a piece of equipment may not be known; here the analyst guesses how long the task might take, based on experience and/or analysis of similar tasks. As the design matures, a progressively more detailed analysis can be performed. The potential to reuse subtasks from other analyses also has potential for efficiency.

The foregoing apparatus and methods provide a systematic way to estimate the time and labor needed to keep an airplane in service. The tool can be used to evaluate impacts of design changes on maintenance elapsed time and labor hours in a disciplined and consistent fashion. It also has the flexibility to evaluate maintenance task times regardless of whether a level of detail and/or design maturity is minimal or complete. The tool can be used to evaluate equipment designs in order to optimize maintenance tasks, resulting in fewer schedule interruptions and lower maintenance hours and costs.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for evaluating time requirements for performing maintenance on a maintenance object, said system comprising one or more processors and memory operable to:
    provide a form on which a user describes a maintenance task;
    make the described task available for maintenance time analysis as at least one of the following: a main task, a subtask of another main task, and an elementary operation; and
    allow the user to combine a plurality of described tasks into one or more hierarchies designated by the users;
    the one or more processors and memory operable to use a time associated with an elementary operation to analyze one or more described tasks and, wherein the time comprises an elapsed time, to use the elapsed time to determine an overlap correction applicable to at least one hierarchy.

2. The system of claim 1, wherein an order of combining described tasks into a hierarchy is controlled by the user.

3. The system of claim 1, wherein the user uses a described task in more than one hierarchy.

4. The system of claim 1, wherein the one or more processors and memory are operable to determine at least one of a labor time and an elapsed time associated with a described task.

5. The system of claim 1, wherein the maintenance object comprises a vehicle.

6. A system for evaluating time requirements for performing maintenance on a maintenance object, said system comprising one or more processors and memory operable to:
    describe a first maintenance task as a first hierarchy of subtasks;
    describe a second maintenance task as a second hierarchy of subtasks;
    relate the second task to the first task as a subtask of the first task;
    use times associated with a plurality of elementary operations included in the subtasks to analyze at least one of the first and second tasks; and
    wherein the times include elapsed times, determine an overlap correction to correct a time associated with a task.

7. A system for evaluating time requirements for performing maintenance on a maintenance object, said system comprising one or more processors and memory operable to:
    describe a first maintenance task as a first hierarchy of subtasks;
    describe a second maintenance task as a second hierarchy of subtasks;
    relate the second task to the first task as a subtask of the first task;
    use times associated with a Plurality of elementary operations included in the subtasks to analyze at least one of the first and second tasks;
    determine a plurality of factors affecting the times; and
    adjust the times to account for the factors.

8. The system of claim 7, wherein the factors comprise at least one of the following: personal time, fatigue, and delay.

9. A method of evaluating time requirements for performing maintenance on a maintenance object, said method comprising the steps of:
    providing a form on which a user describes a maintenance task;
    making the described task available for maintenance time analysis as at least one of the following: a main task, a subtask of another main task, and an elementary operation;
    allowing the user to combine a plurality of described tasks into one or more hierarchies designated by the user;
    using a time associated with an elementary operation to analyze one or more described tasks; and
    wherein the time comprises an elapsed time, using the elapsed time to determine an overlap correction applicable to at least one hierarchy.

10. The method of claim 9, wherein an order of combining described tasks into a hierarchy is controlled by the user.

11. The method of claim 9, wherein the user uses a described task in more than one hierarchy.

12. The method of claim 9, further comprising determining at least one of a labor time and an elapsed time associated with a described task.

* * * * *